United States Patent [19]
Baron

[11] Patent Number: 5,125,120
[45] Date of Patent: Jun. 30, 1992

[54] TOILET WATER REGULATOR

[76] Inventor: Marvin Baron, 10176 SW. 126th St., Miami, Fla. 33176

[21] Appl. No.: 787,838

[22] Filed: Nov. 5, 1991

Related U.S. Application Data

[63] Continuation-in-part of Ser. No. 569,568, Aug. 20, 1990, abandoned.

[51] Int. Cl.⁵ .......................... E03D 1/36; G01F 11/30
[52] U.S. Cl. ........................................ 4/415; 4/366; 137/624.12; 222/20; 222/59
[58] Field of Search ...................... 4/415, 366; 251/15; 137/624.11, 624.12, 624.14, 624.15; 222/14, 16, 18, 20, 59

[56] References Cited

U.S. PATENT DOCUMENTS

| 1,407,752 | 2/1922 | Johns | 222/59 |
|---|---|---|---|
| 1,552,261 | 9/1925 | Belcher | 222/59 |
| 1,809,440 | 6/1931 | Elder | 222/59 |
| 3,166,217 | 1/1965 | Carriol | 222/20 |
| 3,206,071 | 9/1965 | Boudot et al. | 222/20 |
| 3,473,695 | 10/1969 | Anesi | 137/624.11 |
| 3,713,558 | 1/1973 | Pech | 222/20 |
| 3,902,201 | 9/1975 | Bobo | 4/366 X |
| 4,023,708 | 5/1977 | Fornasari | 222/20 |
| 4,079,748 | 3/1978 | Masuda | 4/366 X |
| 4,335,852 | 6/1982 | Chow | 137/624.12 X |
| 4,633,905 | 1/1987 | Wang | 137/624.11 |
| 4,903,731 | 2/1990 | Pappy | 137/624.11 |
| 4,916,762 | 4/1990 | Shaw | 4/366 |
| 5,065,901 | 11/1991 | Brane et al. | 137/624.11 X |

FOREIGN PATENT DOCUMENTS

| 8802045 | 3/1990 | Netherlands | 4/415 |
|---|---|---|---|
| 0360534 | 11/1931 | United Kingdom | 251/15 |

Primary Examiner—William A. Cuchlinski, Jr.
Assistant Examiner—John L. Beres
Attorney, Agent, or Firm—Hedman, Gibson & Costigan

[57] ABSTRACT

A toilet water regulator device which prohibits water flow into the toilet system after a predetermined amount of water has entered the system comprising a valve at the water inlet to the system, said valve having a water outlet to the system, wherein the flow of water through said valve is controlled by turbine means associated with the water outlet of the valve and the amount of water predetermined necessary to fill the tank is controlled by adjustable valve means.

20 Claims, 9 Drawing Sheets

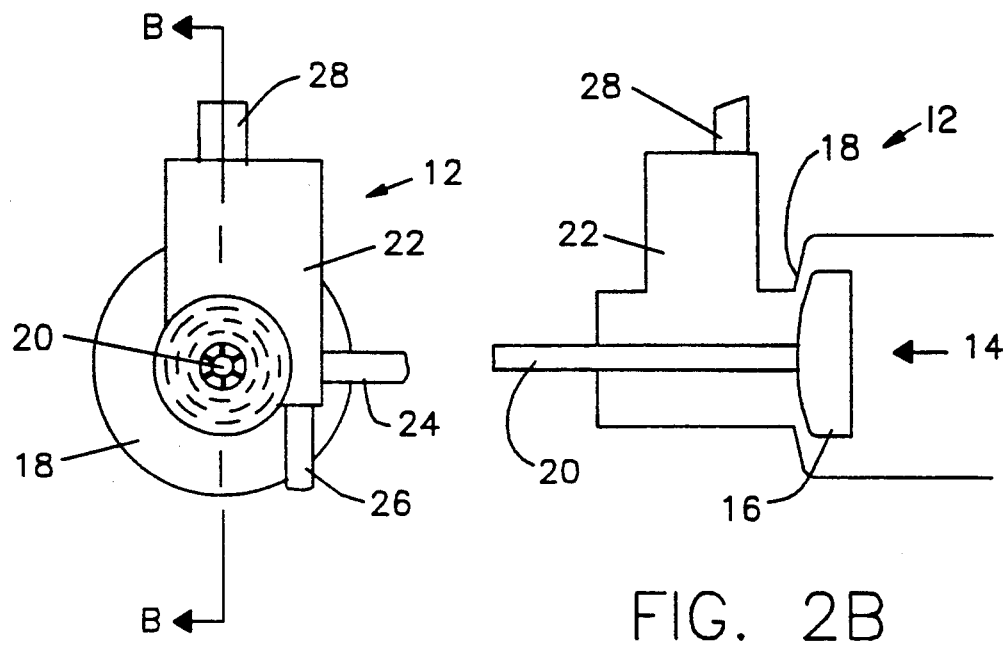
FIG. 2A
FIG. 2B
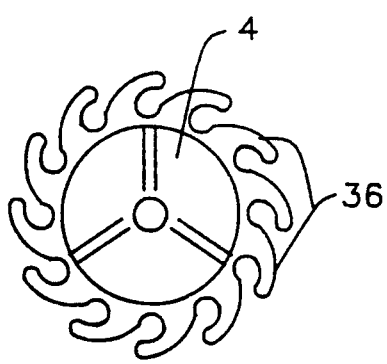
FIG. 3A
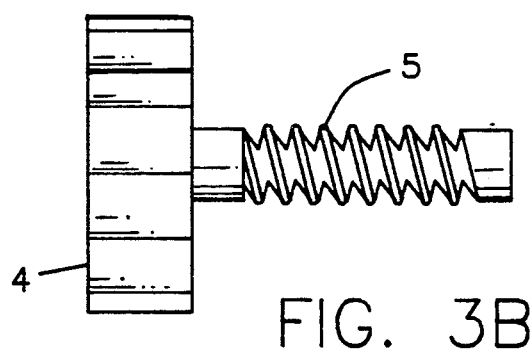
FIG. 3B

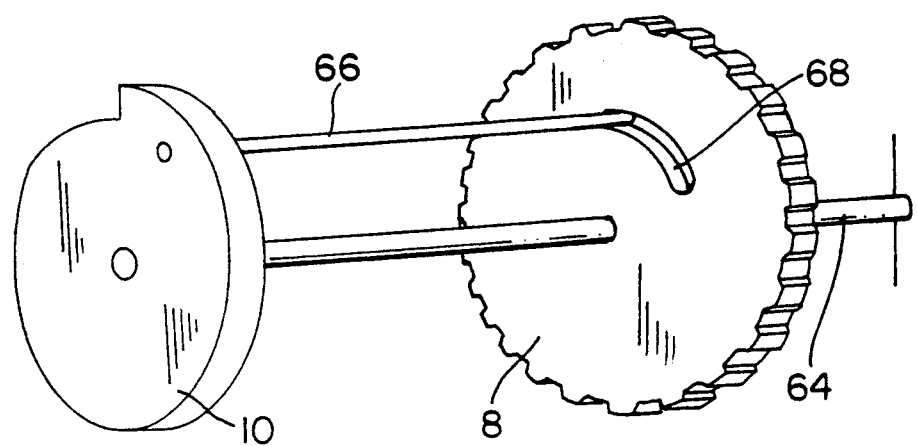
FIG. 10
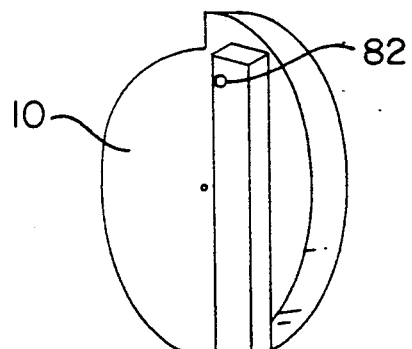
FIG. 12
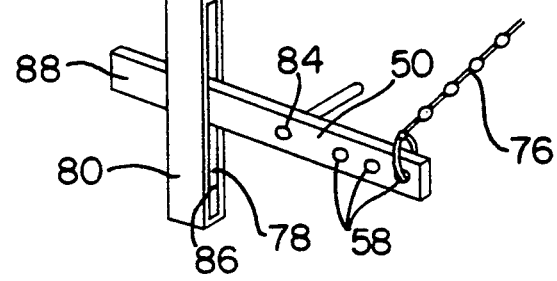

TOILET WATER REGULATOR

REFERENCE TO RELATED APPLICATIONS

The present application is a continuation in part of U.S. patent application Ser. No. 07/569,568 filed Aug. 20, 1990, now abandoned.

FIELD OF THE INVENTION

The present invention relates to a device designed to save water in toilets and urinals that develop a leak.

BACKGROUND OF THE INVENTION

Conservation has become an issue of growing concern. As such, great efforts have been made to limit the waste of natural resources such as water. One area in which water waste has been scrutinized is in toilet use.

The focus of preventing water wasted in the use of toilets has until now been on the use of less water per flush. Persons have widely been advised that they can use less water by placing a brick, a full jug of water, etc. in the toilet tank to limit the volume of water which is used per flush. Also, toilets are in use, generally on a commercial basis, based on a pressure system which have no tank but work with a pressure build-up to allow water flow when the handle is pulled. Additionally, new toilets have been developed which work with reduced amounts of water to complete the flushing action.

However, a leaking toilet will waste water at a rate dependent on the flow rate of the leak, regardless of how little water is used on a per flush basis. This is because toilets regulate the amount of water which exits the system and will allow water to flow through the system anytime the water valve exiting the system is open or leaks. This situation is complicated in tank toilet systems wherein the flapper valve which sits at the bottom of the tank to prohibit water flow is degraded by water, ultimately causing a leak.

It is estimated that leaking toilets are one of the largest sources of wasted water. This problem is especially significant in rental apartments, offices or warehouses where the occupant does not see the water bill and does not have an interest in fixing a leak quickly.

Therefore, it is an object of the present invention to provide a toilet water regulation device which limits the amount of water that enters the system regardless of the water existing the system.

It is a further object of the invention to provide a regulation device which can be adjusted to predetermine the amount of water which will enter the system per flush.

It is another object to provide a regulation device which can be placed in a standard toilet tank or within standard pressure systems that is simple in its mechanism and has few working parts to limit the need for service or replacement.

SUMMARY OF THE INVENTION

These and other objects are achieved with a toilet water regulation device associated with the water inlet of a flush toilet system utilizing a tank comprising inlet valve means on the water inlet, said valve means having a water flow inlet, a water outlet divided into divergent outlets, turbine means placed in line with the water flow from one of said divergent outlets and the other of said divergent outlets directed to the tank, activation means which causes the inlet valve means to open and valve operation means cooperating with said turbine means to hold the inlet valve means open and close the inlet valve means after approximately a predetermined number of revolutions of the turbine means relating approximately to a predetermined amount of water passing over the turbine means, further comprising adjustable valve means cooperating with at least one of the divergent outlets to control water flow passing through the divergent outlet directed to the turbine means whereby the more water passing over the turbine means, the faster the turbine means will rotate and the less water will pass through the inlet valve means and into the tank before the inlet valve means closes.

The turbine means can be any type such as a propeller type, paddle fan, ferris type, wind mill type or curved turbine. The turbine can be sealed and a housing is preferred to cover the turbine and limit water splashing from the turbine when water is directed to the turbine.

The inlet valve can be any type including hydraulic, water pipe, washerless, diaphragm, carburator type, arm type, gate, slide type, screw type, spring type, water pressure type, "V" type, electric or air valves or limit switches used on worm gears or straight rods. However, the preferred valves are O-ring or ball valves having a water inlet, a push pin, an O-ring or ball which cooperates with said push pin and seats in an O-ring or ball seat due to water pressure from the inlet to prohibit water flow and a water outlet. The valve works so that when the pin is depressed, water flows through the valve and when the pin is extended, the O-ring or ball seats and water flow is prohibited.

The valve operation means preferably comprises a cam cooperating with said turbine means having a high portion, a low portion and a drop off point from said high portion to said low portion. The cam cooperates with the valve so that when the cam rotates across the drop off point the valve is changed from the open position to the closed position and water flow stops.

The cam is preferably associated with a round gear having teeth on at least a portion thereof, the teeth of said round gear cooperating with a worm gear associated with the turbine. When the teeth of the round gear are engaged by the worm gear, and water turns the turbine, the turbine turns the worm gear and the worm gear turns the round gear. The turning round gear turns the cam about the high portion of the cam. When the turbine turns a predetermined number of times, relating to a predetermined amount of water which passes over the turbine, the cam turns past the drop off point and the valves shuts off.

The cam can be fixedly attached concentrically to the round gear, with teeth missing from the round gear to allow activation of the device, or pivotably concentrically or non-concentrically attached to the round gear with teeth about the entire round gear. A concentrically or non-concentrically mounted cam associated with a gear having teeth around the entire perimeter necessarily includes means to allow movement of the cam without movement of the gear. Furthermore, straight gears can be used in the system, as can jack type gears, or the cam can be unattached to the gears when utilizing a system such as that which is used in garage door openers. The gears can also be set-up similar to the timing gears of a pool or sprinkler shut-off pump.

Various sized gears can be used with the embodiments to vary the amount of water flowing over the turbine necessary to turn the cam past the drop off point. Also, additional gears can be placed between the turbine and the gear with which the cam is associated to vary the revolutions of the turbine necessary to turn the cam past the drop off point. All such changes would be known to the skilled artisan in the gearing art.

The preferred method of regulating the amount of water needed to close the valve is found in the use of divergent water outlets from the inlet valve wherein one outlet directs water over the turbine and another goes directly to fill the system. One of the divergent outlets would have a separate adjustable valve, such as preferably a ball valve, or any of the types of inlet valves set forth above which can be set to a predetermined water flow, to directly or indirectly regulate water flow through the divergent outlet directed to the turbine. The more water that passes over the turbine, the faster the turbine turns and the faster the valve closes.

For example, since the water inlet into the system is constant, an adjustable valve reducing the flow to the divergent outlet not going to the turbine increases the flow over the turbine, speeding the time it takes to close the valve, so less water will enter the system before the valve closes. Similarly, increasing the water flow through an adjustable valve associated with the divergent outlet not going to the turbine causes less water to go over the turbine, taking longer for the valve to close and allowing more water into the system.

The gears of the system, including the turbine, cam and intermediate gears used, are made of plastic, nylon or stainless steel. The O-ring is preferably made of silicone for a lasting seal.

The activation means is preferably the same handle which is used to open the flapper valve in the bottom of the tank to release the water in the tank, or to activate the flush action in a pressure system with an extension which causes the cam to rotate to its high position, causing water flow. As such, the device can be installed in the tank of any standard toilet utilizing a tank or in the standard pressure systems currently in use.

The device is preferably produced on a backing wall or plate and preferably includes a housing enclosing at least the turbine to limit water splashing from the turbine as water flows over it. The device can be placed directly on the tube of the tank toilet on which the float valve currently in use is mounted, for ease of installation.

BRIEF DESCRIPTION OF THE DRAWINGS

The following drawings, in which like reference characters represent like parts, are included to help understand the invention, and not to limit the invention, wherein:

FIG. 2A is a front plan view of the O-ring valve of the first embodiment of the present invention;

FIG. 2B is a side cross-sectional view of the O-ring valve through line B—B of FIG. 2A;

FIG. 3A is a front elevational view of the turbine of the first embodiment of the present invention;

FIG. 3B is a side elevational view of the turbine with worm gear concentrically attached thereto;

FIG. 10 is a perspective view of another embodiment of the cam and gear assembly allowing movement of the cam without rotation of the gear;

FIG. 12 is a perspective view of activation means for beginning water flow in the present invention.

DETAILED DESCRIPTION OF THE PREFERRED EMBODIMENT

Figure 1:
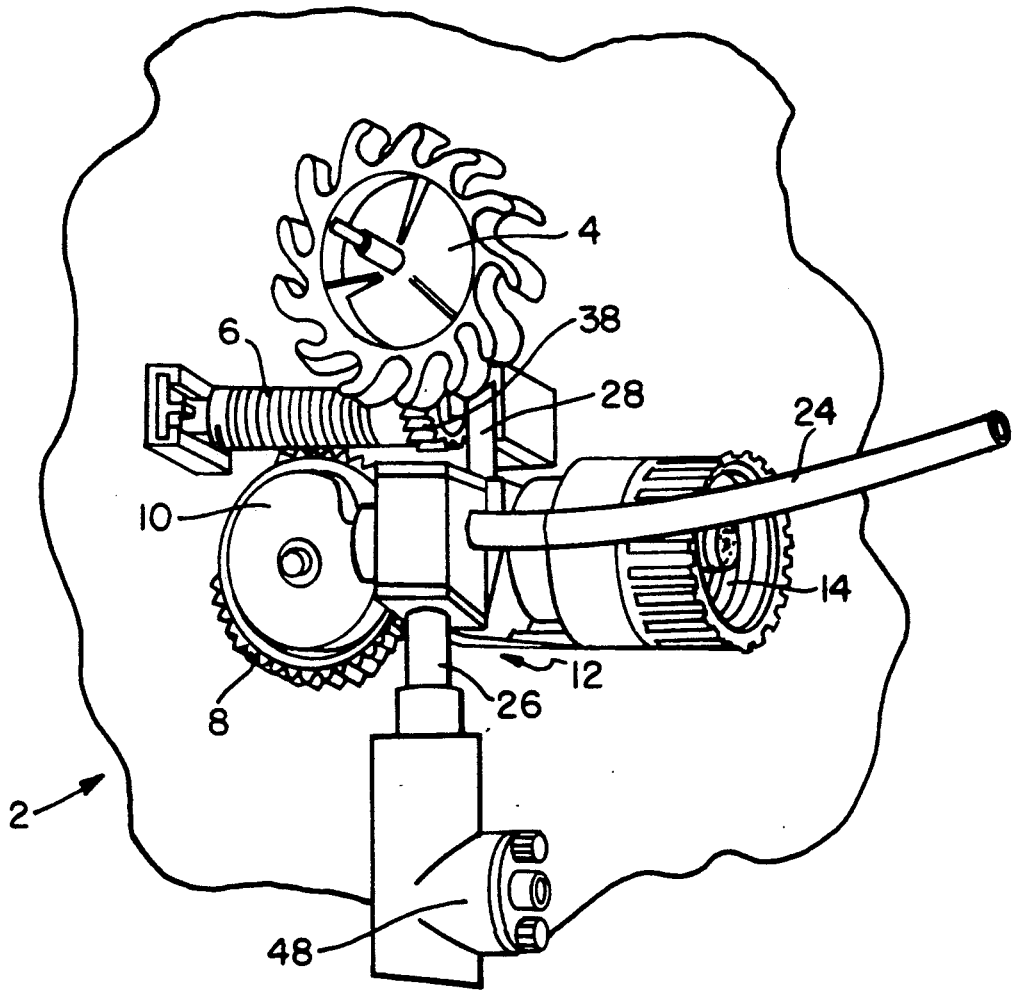
FIG. 1 is a perspective view of one embodiment of the device of the present invention.

With reference to the drawings, and specifically FIG. 1, the preferred embodiment of the water regulator device 2 of the present invention comprises a turbine 4 having a worm gear 5 attached, a second worm gear 6 and a round gear 8 having a cam 10 thereon. The cam 10 engages an O-ring inlet valve 12 which opens and closes in accordance with the position of the cam 10 in relation to the inlet valve 12. The inlet valve 12 regulates water flow from a water inlet 14, such as a pipe or tube leading from a water supply to the inlet valve 12.

The O-ring inlet valve 12 (shown in FIGS. 2A and 2B) comprises an inlet 14, an O-ring 16, and O-ring seat 18, a push pin 20 and an outlet 22. The outlet 22 preferably includes three divergent outlet lines 24, 26 and 28. The first line 24 feeds the overflow in a standard tank, the second line 26, goes to the bottom of the tank to help fill the tank with water more quietly and the third line 28 ends adjacent to the turbine 4 when the valve 12 opens and the water thereafter runs into the tank. However, it is understood that the first line 24 which feeds the overflow is not necessary to the invention.

When the water supply is connected to the O-ring valve 12, the pressure of the water forces the O-ring 16 to seat against the valve seat 18 and stop the water flow. The water pressure against the O-ring 16 causes the pin 20 to be extended unless an external force depresses the pin 20. Sufficient pressure against the pin 20 to depress the pin 20 pushes the O-ring 16 from the O-ring seat 18 and allows water to flow, through the water outlet 22.

The cam 10 on the round gear 8 works in cooperation with the push pin 20 of the inlet valve 12. The pin 20 is in proximity with the cam 10 so that the pin 20 is depressed and extended by the high and low points of the cam 10 respectively. For example, the low point 30 of the cam 10 allows the pin 20 of the valve 12 to remain fully extended, whereby the O-ring 16 seats in valve seat 18 and prevents water flow. When the cam 10 is in its low position 30 with relation to the pin 20, the device is in its ready position and will not allow water to pass through the inlet valve 12 regardless of the water level in the tank.

However, when the pin 20 is engaged by the high phase of the cam 10, from the beginning of the high portion 32 to the drop off point 34, the cam 10 depresses the pin 20 to the point where the O-ring 16 moves from the O-ring seat 18 and allows water to flow through the outlet 22.

Figure 5A:
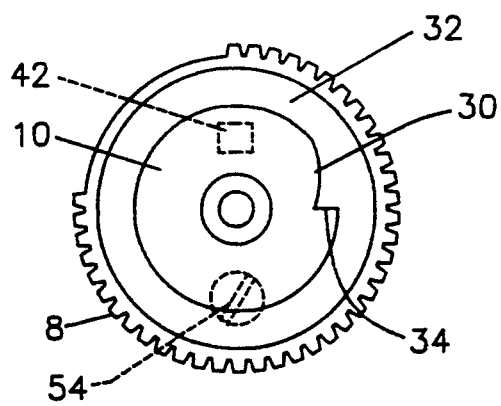
FIG. 5A is a front elevational view of the round gear of the present invention with the cam attached.
Figure 5B:
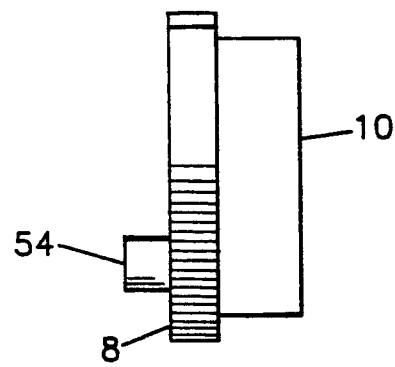
FIG. 5B is a side elevational view of the round gear of the present invention with the cam attached.

In the embodiment shown in FIG. 1, with the cam 10 shown in FIGS. 5A and 5B, the round gear 8 has teeth missing at a strategic location across a specific portion of the perimeter determined by the position of the cam 10 in relation to the pin 20 of the inlet valve 12. The teeth are missing from the perimeter of the round gear 8 from a point beginning relative to when the pin 20 moves across the drop off point 34 of the cam 10, where the pin 20 is allowed to extend and water flow stops. At that point, the last of the teeth of the round gear 8 must have moved off of the worm gear 6.

The teeth on the round gear 8 start again at a point when the high point 32 pushes in the pin 20 and allows water flow so that the turning turbine 4 turns the worm gear 6 and the teeth of the round gear 8 engage the turning worm gear 6. The space provided by the missing teeth is necessary in the embodiment with the cam 10 concentrically and fixedly attached to the round gear 8 to allow the cam 10 to turn from the low point 30 to the high point 32 upon activation without interference from teeth on the round gear engaging the worm gear 6.

Figure 9:
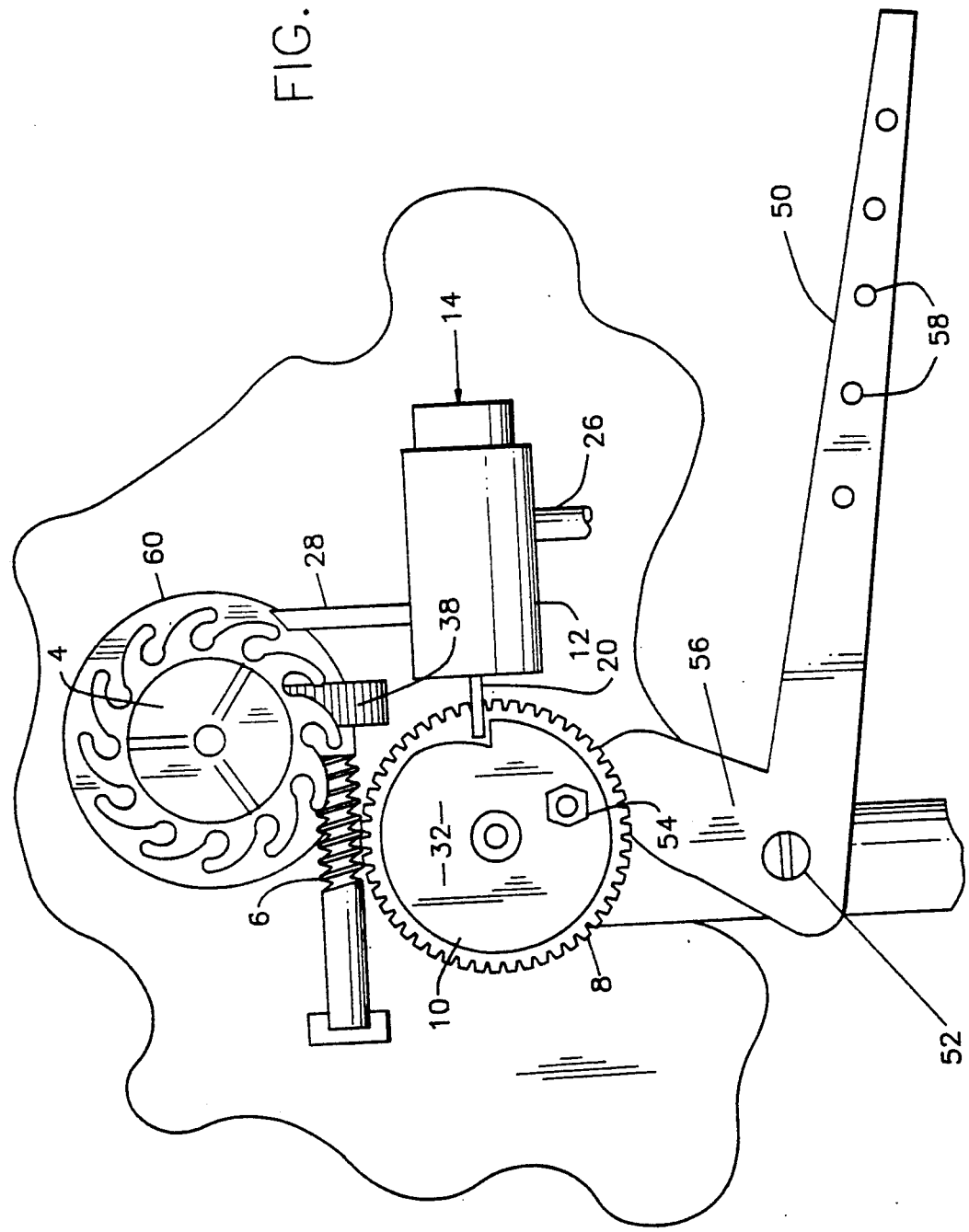
FIG. 9 is a plan view of the device of the first embodiment with activation means and housing to cover the turbine.

To activate the device 2, the activation means shown in FIG. 9, comprising an extension 50 which turns on a pivot 52 to rotate a projection 54 on the cam 10, as well as the round gear 8 attached thereto, moves the cam 10 to the beginning of the high portion 32, depressing the pin 20 and allowing water to flow. The missing teeth of the round gear 8 allows the cam 10 to rotate without interference of the teeth of the round gear 8 engaging the worm gear 6.

As stated above, the teeth of the round gear 8 strategically begin again, and engage the worm gear 6 again, when the pin 20 engages the beginning of the high portion 32 of the cam 10. At this point, the water begins to flow through the valve 12 and out lines 24, 26 and 28. The flow from the line 28 which passes over the blades 36 of the turbine 4 causes the turbine 4 to revolve at a rate proportional to the amount of water passing over it.

A weight 42 is strategically located on the cam 10, or round gear 8, so that when the device 2 is activated the round gear 8 is ensured to rotate sufficiently so that the teeth of the round gear 8 engage the teeth of the worm gear 6. The weight 42 should be at a point just before the top of the cam 10 (i.e. 11:30 o'clock) when the pin 20 is extended at the low point 30 of the cam 10.

Figure 6:
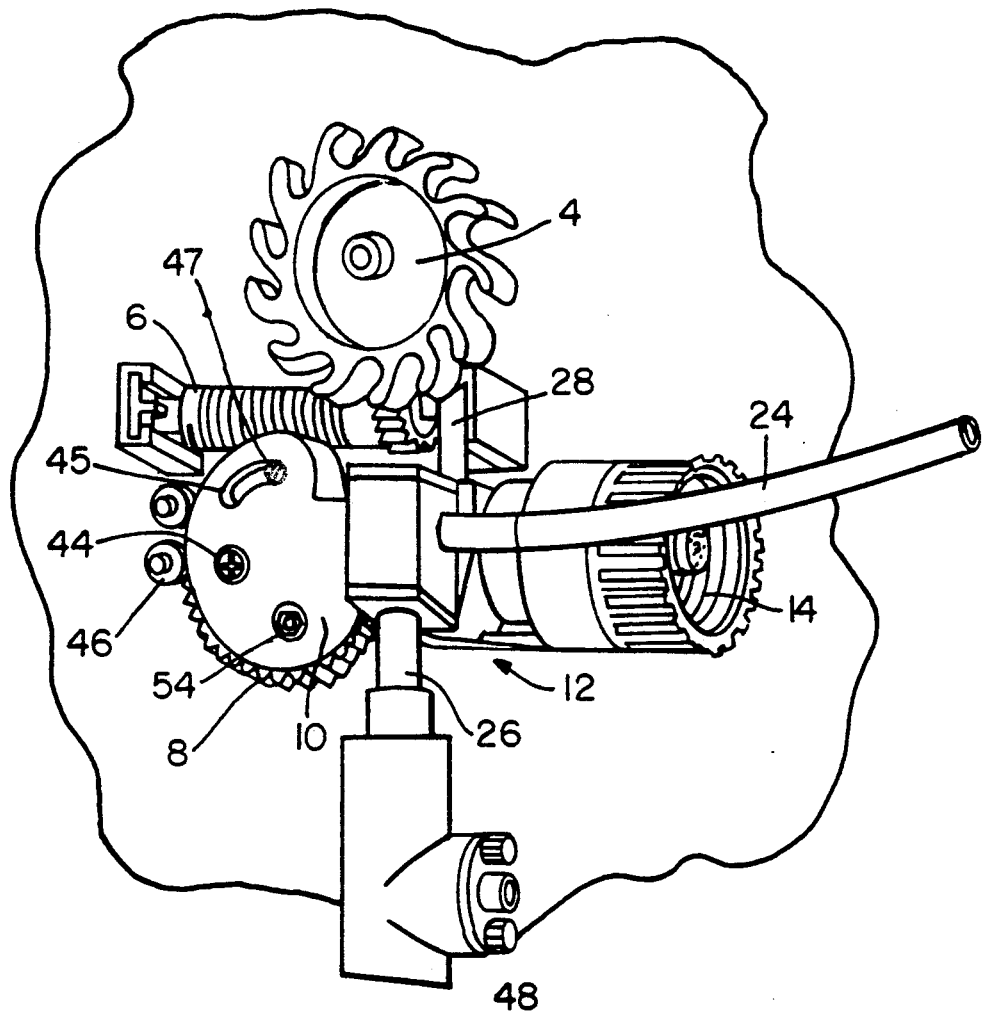
FIG. 6 is a perspective view of a second embodiment of the present invention wherein the cam is non-concentrically attached to the round gear.
Figures 7A, 7B:
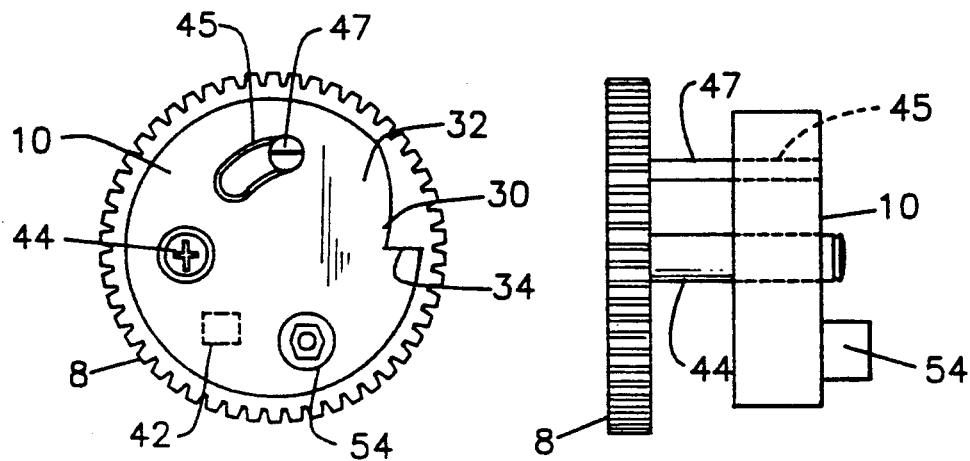
FIG. 7A is a front view of the round gear and cam of the second embodiment.
FIG. 7B is a side plan view of the round gear and cam of the second embodiment.

In another embodiment, shown in FIG. 6, the cam 10 is non-concentrically attached to the round gear 8 and no teeth are missing from the round gear 8 (see FIGS. 7A and 7B). Activation means, including an extension 50 which engages a projection 54 on the cam 10 moves the cam 10 to its high point 32 by pivoting the cam 10 on its attachment axis 44, with a stop 46 included to prevent the cam 10 from pivoting too far. To prevent the cam 10 from pivoting too far a slot 45 can be used on the cam 10 in which a second attachment 47 to the round gear 8 is placed. The throw of the attachment in the slot 45 limits excessive rotation of the cam 10.

When the cam 10 is pivoted so the high point 32 depresses the pin 20 water flow turns the turbine 4, thereby rotating the round gear 8 so the cam 10 turns through its high phase. As with the previous embodiment, a strategically placed weight 42 can be used to ensure that the cam 10 rotated on its axis 44 remains with its high point 32 depressing the pin 20 until the turbine 4 rotates the round gear 8 sufficiently to rotate the cam 10. The weight 42 in this embodiment, however, must be placed in line with the attachment axis 44.

In this embodiment, the low portion 30 of the cam 10 is shorter so that the cam 10 need only be pivoted a short distance, equivalent to the throw of the slot 45, for the high point 32 to depress the pin 20 and begin the water flow.

In yet another embodiment, shown in FIG. 10, the cam 10 can pivot about a concentric axis 64 without movement of the round gear 8, having teeth about the entire perimeter thereof, through the use of a shaft 66 fixedly attached to the cam 10 which travels in a slot 68 in the round gear 8. Movement of the cam 10 shown in FIG. 10 in a clockwise direction moves the shaft 66 in the slot 68 to a point where the cam 10 pushes in the pin 20 of the valve 12, described above. Excessive rotation of the cam 10 is limited by the length of the slot 68. When water flowing turns the gear 8 to the point that other end of the slot 68 catches up with the shaft 66, the cam 10 turns as above.

It is understood that the embodiment of FIG. 10 can alternatively use a shaft 66 fixedly attached to the round gear 8 which cooperates with a slot 68 in the cam 10.

Figure 4A:
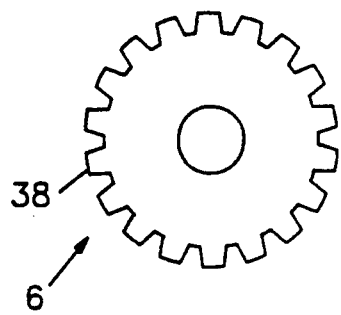
FIG. 4A is a front elevational view of the second worm gear.
Figure 4B:
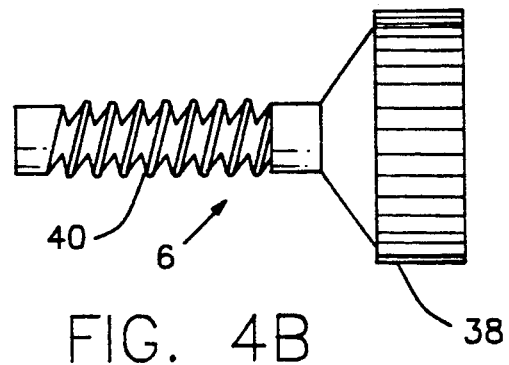
FIG. 4B is a side elevational view of the second worm gear.

The turbine 4 and attached worm gear 5 are best shown in FIGS. 4A and 4B. As the turbine 4 turns with water passing over it, it turns the worm gear 5, attached concentrically about the axis of the turbine 4. The teeth of the worm gear 5 are in constant engagement with the teeth of an end gear 38 attached concentrically about the axis of the second worm gear 6. Rotation of the turbine 4, therefore, causes rotation of the second worm gear 6.

The teeth of the worm portion 40 of the second worm gear 6 engage the teeth of the round gear 8, to rotate the round gear 8 and cam 10 across the high portion of the cam 10 (i.e. from the beginning of the high portion 32 to the drop off 34). At the drop off point 34 the pin 20 is forced out by the water pressure, the O-ring 16 seats, water stops flowing and the turbine 4 stops spinning.

Figure 8:
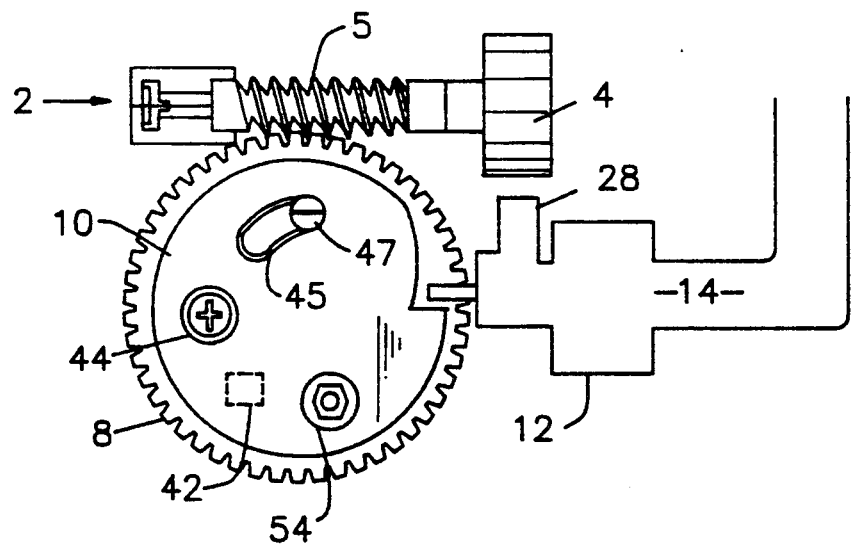
FIG. 8 is a perspective view of a two gear embodiment.

The use of an intermediate worm gear 6 is not essential to the invention, wherein the worm gear 5 attached concentrically to the turbine 4 can directly engage the teeth of the round gear 8, as shown in FIG. 8. However, the use of the second worm gear 6 is preferred for regulating the timing relating to the number of rotations of the turbine 4 necessary for a full rotation of the cam 10.

Alternatively, elimination of the intermediate worm gear 6 may require a larger round gear 8 to provide proper timing, as described below, when used in a standard tank system. Although the device 2 of FIG. 8 is shown with the cam 10 non-concentrically attached to the round gear 8, it is understood that it can be concentrically attached with missing teeth or concentrically attached using a shaft and slot arrangement, as described above.

The turbine 4, worm gear 5, end gear 38, second worm gear 6, round gear 8 and cam 10 can be made of any suitable material including plastics, nylon, stainless steel, polyesters, etc., with plastic or nylon being preferred. Suitable for this use is DELRIN plastic. The preferred gears are 32 pitch, the round gear having either 54 or 60 teeth, with 11 or 12 teeth removed for the first embodiment.

The housing of the inlet valve 12 can also be made of plastic or any other suitable material. The O-ring 16 can be made of rubber or other suitable material and is preferably made of silicone to ensure long life.

The device 2, if not just the turbine 4, preferably has a housing 60 to limit water splashing off of the turbine 4 when water is flowing through the inlet valve 12 and divergent outlet 28. The housing 60 necessarily has an opening or outlet 72 to allow the water passing over the turbine 4 to enter the system, and is preferably made of plastic, plexiglass or a like material.

Figures 11A, 11B:
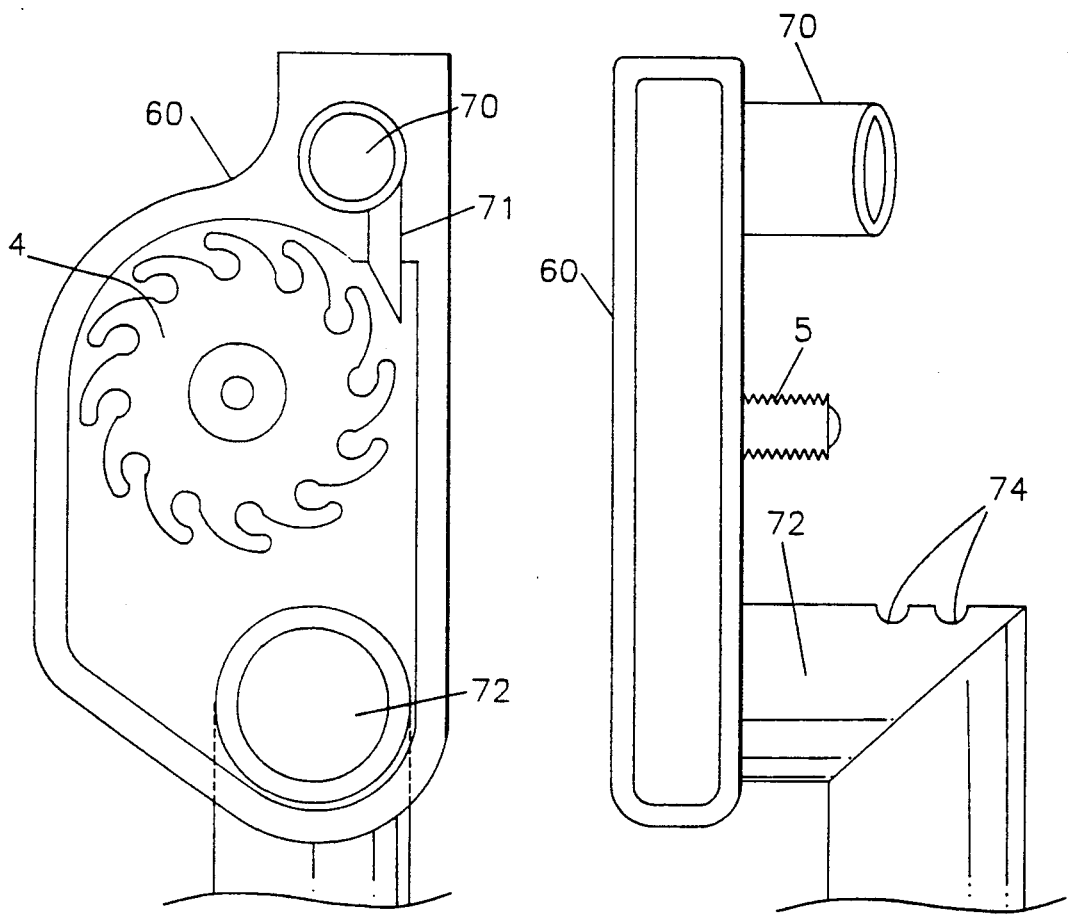
FIG. 11A is a front elevational view of a turbine housing.
FIG. 11B is a side elevational view of the turbine housing of FIG. 11A.

A preferred housing structure is shown in FIGS. 11A and 11B. The housing 60 is generally shaped to conform to the turbine 4 with an inlet 70 for access of divergent outlet line 28 ending in a channel 71 for properly directed flow over the turbine 4, and a water outlet 72 which directs the water from the turbine 4 to the bottom of the tank (not shown) to fill the tank. The outlet 72 preferably includes one or more vent holes 74 for easy flow of water out the outlet 72. The housing 60 also has a sealed opening (not shown) through which the worm gear 5 passes to allow for contact with the end gear 38, but does not allow water to escape.

The handle means used to activate the flush action of the toilet or urinal is used to rotate the cam 10 to activate the present device 2. Therefore, in the tank system, the handle which lifts the flapper valve at the bottom of tank to let water flow out of the tank also raises the extension 50 and turns the cam 10 to the high portion 32, allowing water to flow through the inlet valve 12. As shown in FIG. 9, the extension 50 which cooperates with the handle has an engagement portion 56 about a pivot 52 which engages a projection 54 on the cam 10 or round gear 8.

As seen in FIG. 9, the extension 50 has several holes 58 to allow proper engagement with the handle means by wire, chain 76, etc. When the handle means is activated the extension 50 is lifted and the engagement portion 56 moves about the pivot 52 to push the projection 54 around, moving the cam 10 to its high point 32.

Alternatively, as shown in FIG. 12, the end 88 opposite engagement with a chain 76 attached to extension 50 travels in a slot 78 having two stops in arm 80. The opposite end of arm 80 engages a stud 82 on the cam 10. When the chain 76 is pulled the extension 50 pivots on pivot 84 secured to a fixed plate 90 and the opposed end 88 presses down on the stop bottom 86, preferably rounded, of the slot 78 to pull down the arm 80 attached to stud 82 on the cam 10, thereby rotating the cam 10 to start the water flow. The throw of the extension 50 is sufficient to move the cam 10 from its low position 30 to its high position 32.

Figure 13:
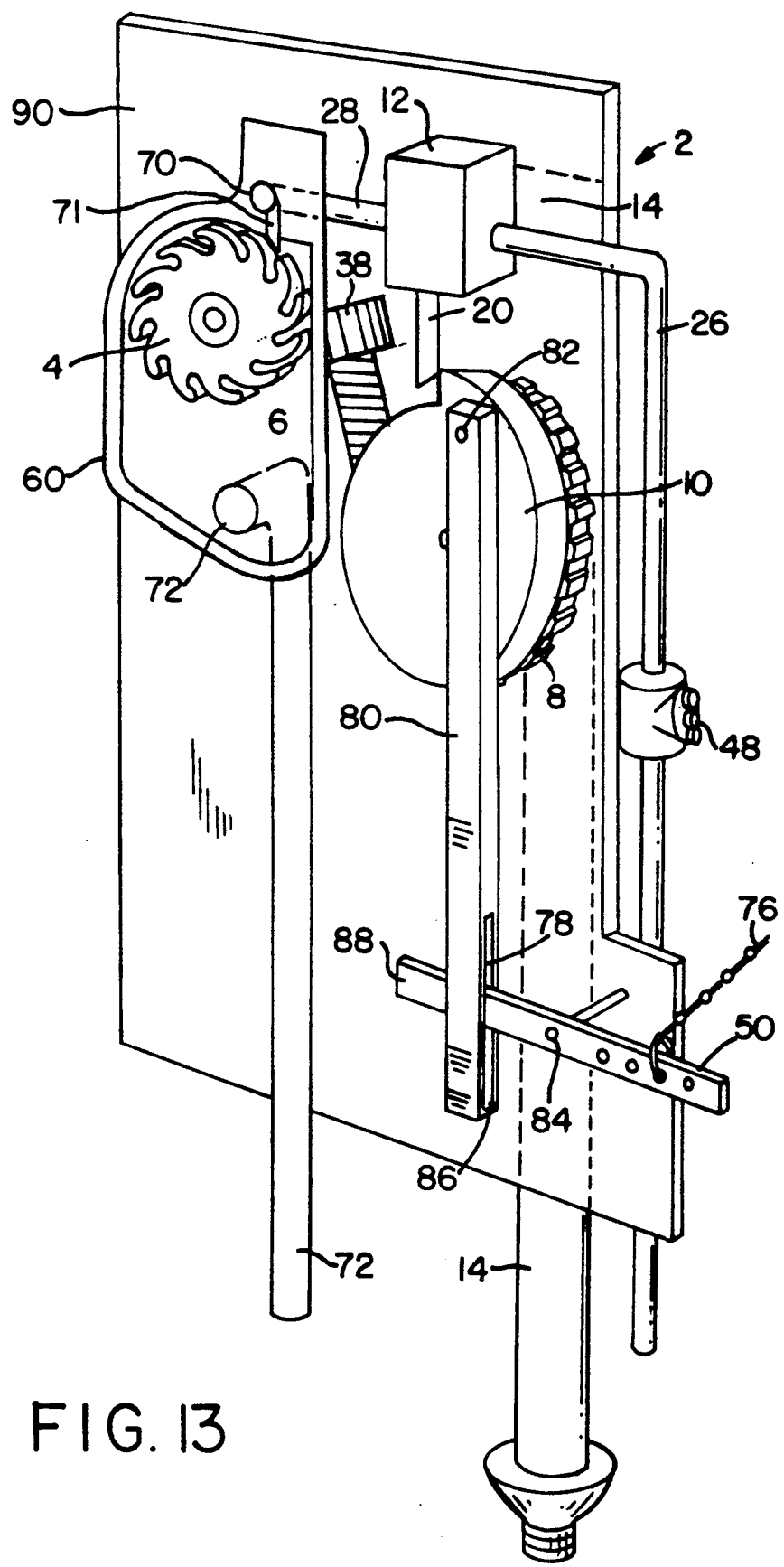
FIG. 13 is a perspective view of the configuration of the preferred embodiment.

A preferred configuration of the present invention is shown in FIG. 13 mounted on a plate member 90.

The device 2 works as follows. When the device 2 is in its ready position the pin 20 of the inlet valve 12 is extended within the low point 30 of the cam 10, the O-ring 16 is seated in the O-ring seat 18 due to water pressure of the water from the valve inlet 14.

The device 2 is activated by the flush activation means of the toilet, which rotates the cam 10 to the beginning of the high point 32 of the cam 10. The high point 32 of the cam 10 depresses the pin 20 of the valve 12, allowing water to flow through the inlet valve 12.

The water flows through the valve outlet 22 and through divergent outlet lines 24, 26 and 28. The water flowing through the first line 24 goes to the overflow, as is standard in most toilets, the second line 26 goes to the bottom of the tank to quietly fill the tank, and the third line 28 is directed to just above the blades 36 of the turbine 4 to turn the turbine 4.

The water flow from line 28 turns the turbine 4 and the worm gear 5 attached thereto. The worm gear 5 attached to the turbine 4 turns the end gear 38 of the second worm gear 6, thereby turning the worm portion 40 of the second worm gear 6. The teeth of the worm portion 40 engage the teeth of the round gear 8, thereby turning the cam 10 across its high portion (i.e. from the beginning of the high portion 32 to the drop off point 34). While the cam 10 is moving across its high portion it holds the pin 20 in and allows water to flow from the inlet valve 12.

When the gears rotate to the point that the pin 20 passes the drop off point 34 and is allowed to extend, the pressure from the water at the water inlet 14 closes the inlet valve 12 by seating the O-ring 16 in the O-ring seat 18 and the water flow stops. The absence of water flow also stops the turbine 4 and all subsequent gears from rotating.

Since the gearing of the device 2 works with the volume of water passing over the turbine 4 on a timing theory, the amount of water to pass through the valve 12 on a per flush basis can be regulated in a number of ways. This is important where use of the device 2 would eliminate the need for a float valve in a standard toilet tank.

One way to regulate the volume of water going through the inlet valve 12 is to change the size or number of the gears between the turbine 4 and the cam 10. For example, the larger the round gear 8, the longer it will take for the cam 10 to make a full rotation and the longer the pin 20 will be depressed, allowing more water to flow. Similarly, a smaller round gear 8 will allow less water to flow.

The preferred method of regulating the volume of water, however, is to put a regulating device, i.e. an adjustable valve 48, on one or both of the lines 24 and 26 or on line 28 to regulate the flow of water over the turbine 4. For example, the less water that flows through lines 24 and/or 26, the more water will flow through line 28 and the faster the turbine 4 will spin. Likewise, when more water is allowed to flow through line 28 the faster the turbine 4 will spin. The faster the turbine 4 spins, the less time it will take for a full rotation of the cam 10, the less water will pass through the valve 12.

Similarly, the more water that passes through lines 24 and 26, through closing or reducing water flow through a valve (not shown) on line 28 or opening or increasing water flow through a valve 48 on line 26 and/or a valve (not shown) on line 24 the less water passes over the turbine 4. The less water over the turbine 4 the slower the rotation of the gears and the more water will pass into the tank through the combined flow through lines 26 and 28 before the cam 10 allows the pin 20 to extend and flow through the inlet valve 12 to stop.

Of course, when the device 2 is installed in a tank system and there is a leak in the flapper valve, the tank will empty but water will not flow into the tank due to the device 2. Therefore, when flushing the toilet the handle will have to be activated twice, once to fill the tank with water and another time to flush.

While the invention has been described in detail and with reference to several specific embodiments thereof, it will be apparent to one skilled in the art that various changes and modifications can be made therein without departing from the spirit and scope thereof. For example, a straight gear may be used between the turbine 4 and the cam 10, or gear means without teeth, causing rotation by contact or belts. Such obvious variations, however, are covered by the invention, limited only by the appended claims.

I claim:

1. A toilet water regulation device associated with the water inlet of a flush toilet system utilizing a tank comprising inlet valve means on the water inlet, said inlet valve means having a water outlet divided into divergent outlets, turbine means placed in line with the water flow from one of said divergent outlets and another of said divergent outlets directed to the tank, activation means which causes the inlet valve means to open and valve operation means cooperating with said turbine means to hold the inlet valve means open and close the inlet valve means when the turbine means has turned approximately a predetermined number of revolutions of the turbine means relating approximately to a predetermined amount of water passing over the turbine means, further comprising adjustable valve means cooperating with at least one of the divergent outlets to control water flow passing through the divergent outlet directed to the turbine means whereby the more water passing over the turbine means the faster the turbine means will rotate and the less water will pass through the inlet valve means before the inlet valve means closes.

2. The device of claim 1 wherein the inlet valve means comprises an O-ring valve, having a water flow inlet, a push pin, an O-ring which cooperates with said push pin and seats in an O-ring seat due to water pressure from the water flow inlet to prohibit water flow through the water outlet wherein when the push pin is depressed water flows through the outlet and when the pin is extended the O-ring seats and water flow stops.

3. The device of claim 2 wherein the valve operation means comprises a rotatable cam cooperating with said turbine means, said cam having a high portion, a low portion and a drop off point from said high portion to said low portion, wherein the cam cooperates with the pin of the inlet valve so that when said cam is in its low position the pin is extended, when the cam is in its high position the pin is depressed and when the pin goes past the drop off point the pin goes from a depressed to an extended position.

4. The device of claim 3 further comprising a round gear which cooperates with the cam, said round gear having teeth on at least a portion thereof, and a worm gear associated with the turbine means wherein the worm gear is rotated upon rotation of the turbine means and said worm gear causes rotation of the round gear, thereby rotating the cam.

5. The device of claim 4 wherein the cam is concentrically, fixedly attached to the round gear and the round gear has teeth missing from a strategic location about a portion thereof to allow the activation means to rotate the cam from its low position to its high position, to begin the water flow over the turbine means, by allowing the round gear to rotate across the worm gear without interference from engagement of the teeth thereof.

6. The device of claim 4 wherein the cam is non-concentrically, pivotably attached to the round gear to allow the cam to be moved from its low portion to its high portion, to begin water flow over the turbine means, without rotation of the round gear wherein said round gear has teeth around its entire perimeter which are in constant engagement with the worm gear.

7. The device of claim 4 wherein the cam is concentrically, pivotably attached to the round gear, the round gear having teeth about the entire perimeter thereof, wherein the cam further comprises a shaft non-concentrically, fixedly mounted thereon extending into and engaging a semi-circular slot in the round gear to allow rotation of the cam from its low portion to its high portion, causing water to flow, without rotation of the round gear.

8. The device of claim 4 wherein the cam is concentrically, pivotably attached to the round gear, the round gear having teeth about the entire perimeter thereof, wherein the round gear further comprises a shaft non-concentrically mounted thereon extending into and engaging a semi-circular slot in the cam to allow rotation of the cam from its low portion to its high portion, causing water flow, without rotation of the round gear.

9. The device of claims 5, 6, 7 or 8 further comprising a balance weight strategically placed on the cam to ensure proper positioning of the cam at is high portion once the activation means has been activated.

10. The device of claim 1 wherein the activation means comprises a pivotable extension member which cooperates with the activation means for the toilet flush action and moves the cam from its low position to its high position.

11. The device of claim 10 wherein the activation means further comprises a stud member on the cam to which the top of an arm member is pivotably mounted, the bottom of the arm member being in cooperation with one end of the extension member, said extension member including a pivot means between said one end which cooperates with said arm member and a second end which cooperates with the toilet flush action activation means, wherein when the toilet flush action activation means is activated the extension member is pivoted about said pivot means to move said arm member which in turn rotates the cam through cooperation with said stud member, the throw of the extension member upon pivoting being about equivalent to rotation of the cam from its low position to its high position.

12. The device of claim 11 wherein the bottom of the arm member further comprises a slot through which said one end of said extension member extends, said slot having a stop for cooperation with said one end of said extension member, so that when the extension member acts on the arm member to rotate the cam through contact with the stop of the slot in the arm member, the extension member can be pivoted without further affecting rotation of the cam.

13. The device of claim 2 wherein the O-ring is made of silicone.

14. The device of claim 4 wherein the turbine, the round gear, the cam and the worm gear are made from materials taken from the group comprising plastic, nylon and stainless steel.

15. The device of claim 1 further comprising a housing which covers the turbine to prevent splash, having a housing inlet and a housing outlet wherein the divergent outlet directed to the turbine means feeds the housing inlet which channels the water flow to the turbine means to turn the turbine means and the housing outlet directs the flow of water having moved over the turbine means to exit the housing to the tank of the toilet system.

16. The device of claim 15 wherein the housing outlet further comprises a downflow tube to the lower portion of the tank to quietly fill the tank with water directed over the turbine means.

17. The device of claim 16 wherein the housing outlet further comprises vent openings to enhance water flow through the housing outlet to the tank.

18. The device of claim 1 wherein the adjustable valve means cooperates with the divergent outlet directed to the turbine means, to variably adjust the flow of water over the turbine means and therefore the speed of rotation of the turbine means and the total water flow through the device before the inlet valve closes.

19. The device of claim 1 wherein the adjustable valve means cooperates with the divergent outlet directed to the tank, to variably adjust the flow of water therethrough, and inversely adjust the flow of water through the divergent outlet directed to the turbine means and therefore the speed of rotation of the turbine means and the total water flow through the device before the inlet valve closes.

20. The device of claim 1 wherein the adjustable valve means is taken from the group comprising a ball valve, a screw-type valve, a diaphragm valve, a carburator-type valve, an arm-type valve, a gate-type valve and a slide-type valve.

* * * * *